March 10, 1931.     H. PEIKERT     1,796,215
AIR PRESSURE CONVEYER
Filed May 24, 1928
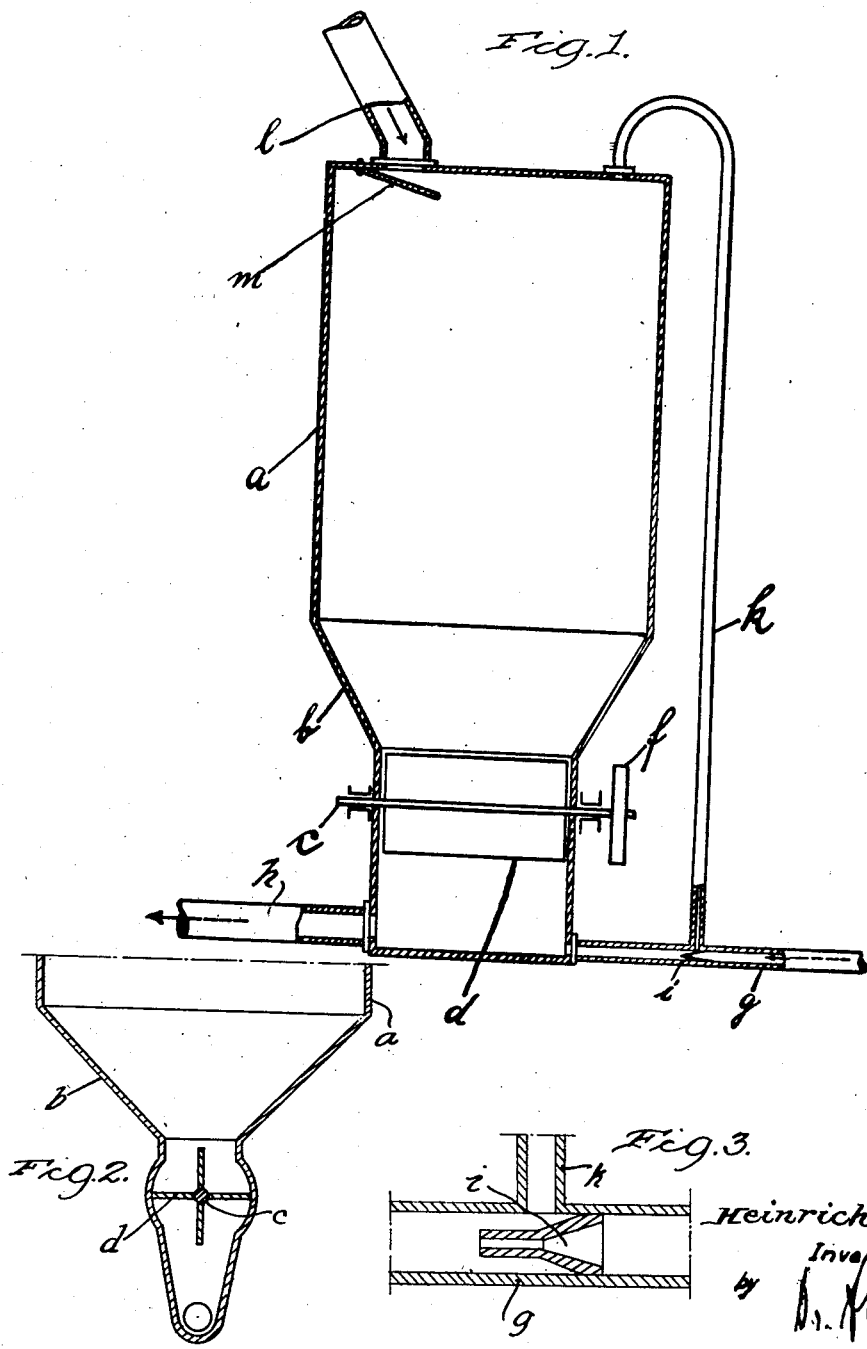

Patented Mar. 10, 1931

1,796,215

UNITED STATES PATENT OFFICE

HEINRICH PEIKERT, OF KALKBERGE, GERMANY

AIR-PRESSURE CONVEYER

Application filed May 24, 1928, Serial No. 280,288, and in Germany June 4, 1927.

This invention relates to air-pressure conveyers, and more especially to conveyers of this kind which serve for the conveyance of pulverized materials. Air-pressure conveyers for pulverized materials are known which consist essentially of a container, such as a bin or the like, and a compartment-wheel provided below said container or bin. In air-pressure conveyers of this kind the material to be conveyed is immediately carried into a stream of pressure-air by means of said compartment-wheel, the pressure-air forcing said material into the discharge conduit proper. Experience with pressure-air conveyers of this kind has shown that as soon as a certain counter-pressure is generated due to the motion of the material in the conveying conduit, there will arise the danger that a part of the pressure-air enters through the compartment-wheel back into the bin or container. This will have the effect that the material contained therein will be stirred up and uselessly discharged which will cause much annoyance to the persons operating the conveyer and proper filling of the compartment will be difficult or impossible to effect.

In addition to this, the mechanical efficiency of the device will be greatly reduced by this backward motion of the pressure-air.

By my invention these disadvantages are fully avoided. My invention consists essentially therein that a suitable pipe-conduit is inserted intermediate the conveying conduit and the bin, this pipe-conduit effecting a compensation of the pressures arising in the pressure conduits. If therefore, for instance, a pressure of 1.8 atmospheres prevails in the conveying conduit by inserting the said pipe-conduit, the effect will be obtained that an even pressure prevails in the bin or container. In this case, however, it is essential that the pipe-conduit which is used for bringing about this compensation of pressure is branched-off the pressure-air supply-conduit immediately past or on the downstream side of the nozzle and not from the conveying or discharging pipe-conduit.

In the accompanying drawing I have represented an example of a conveyer constructed according to my invention. Fig. 1 is a vertical section through the air-pressure operated conveyer according to my invention and Fig. 2 is a partial cross-section through the under part of said conveyer, said cross-section showing the feed wheel therein, and Figure 3 is an enlarged sectional view of a portion of the arrangement shown in Figure 1 illustrating the preferred relative disposition of the nozzle and the compensating pipe-conduit. In the drawing, $a$ is the bin or container to which the pulverized material to be treated is supplied by means of the pipe-stud $l$, which is provided with a flap, valve or the like $m$ serving to close up said pipe-stud. The bin or container $a$ merges below into a conical part $b$, a compartment wheel $d$ or the like serving to supply proper portions of the material through the apparatus. The compartment-wheel $d$ is rigidly mounted on a shaft $c$ which may be driven by means of the pulley $f$. Underneath the compartment-wheel $d$ there is provided a hollow chamber into which the material to be conveyed by the conveyer is emptied by means of said compartment-wheel. Pressure-air is introduced into said hollow chamber by way of the pressure-air conduit $g$, while the material after being conveyed through the conveyer may be discharged therefrom by means of the discharge conduit $h$ as indicated by the arrows in the drawing. Inserted into the pressure-air supply-conduit $g$ is a perforated member or nozzle and the pipe-conduit $k$ which serves for bringing about the compensation of pressure is branched off the pressure-air supply-conduit $g$ adjacent the delivery end of said nozzle $i$. The opposite end of the pipe-conduit $k$ is connected with the bin or container as may be seen from the drawing.

I claim:

An air pressure operated conveyer for pulverized material, comprising a bin adapted to receive the material and having a discharge opening therein, a compartment wheel associated with said discharge opening, a chamber beneath said compartment wheel into which the material is discharged by said wheel, said chamber having a discharge opening therein, a conduit for delivering air under pressure to said chamber, a nozzle in said conduit, and a pipe connection between said bin and a point in said conduit adjacent said nozzle and on the delivery side of said nozzle.

In testimony whereof I affix my signature.

HEINRICH PEIKERT.